INVENTOR
JOHN C. HOLMQUEST
BY
Smythe & Moore
ATTORNEYS

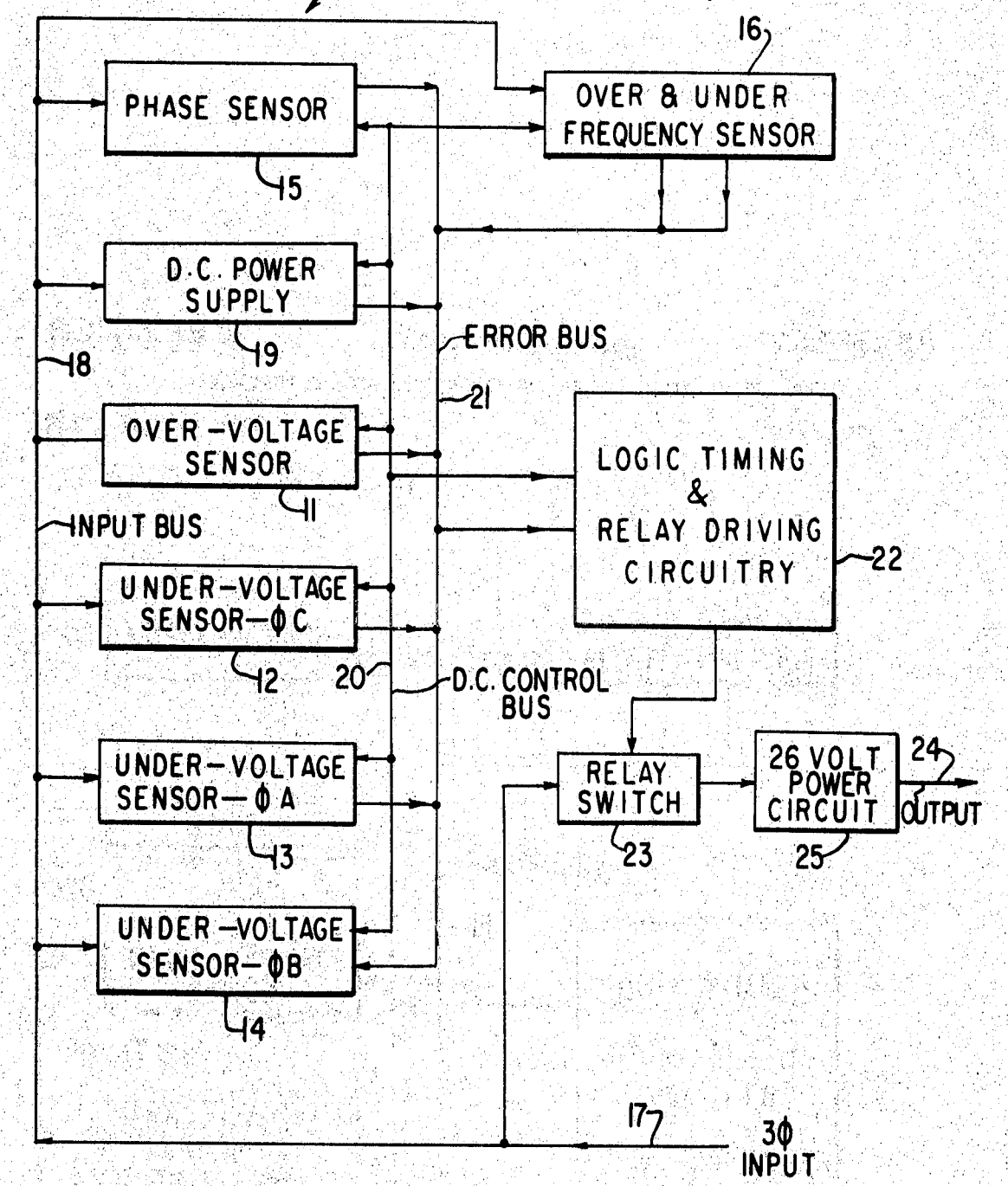

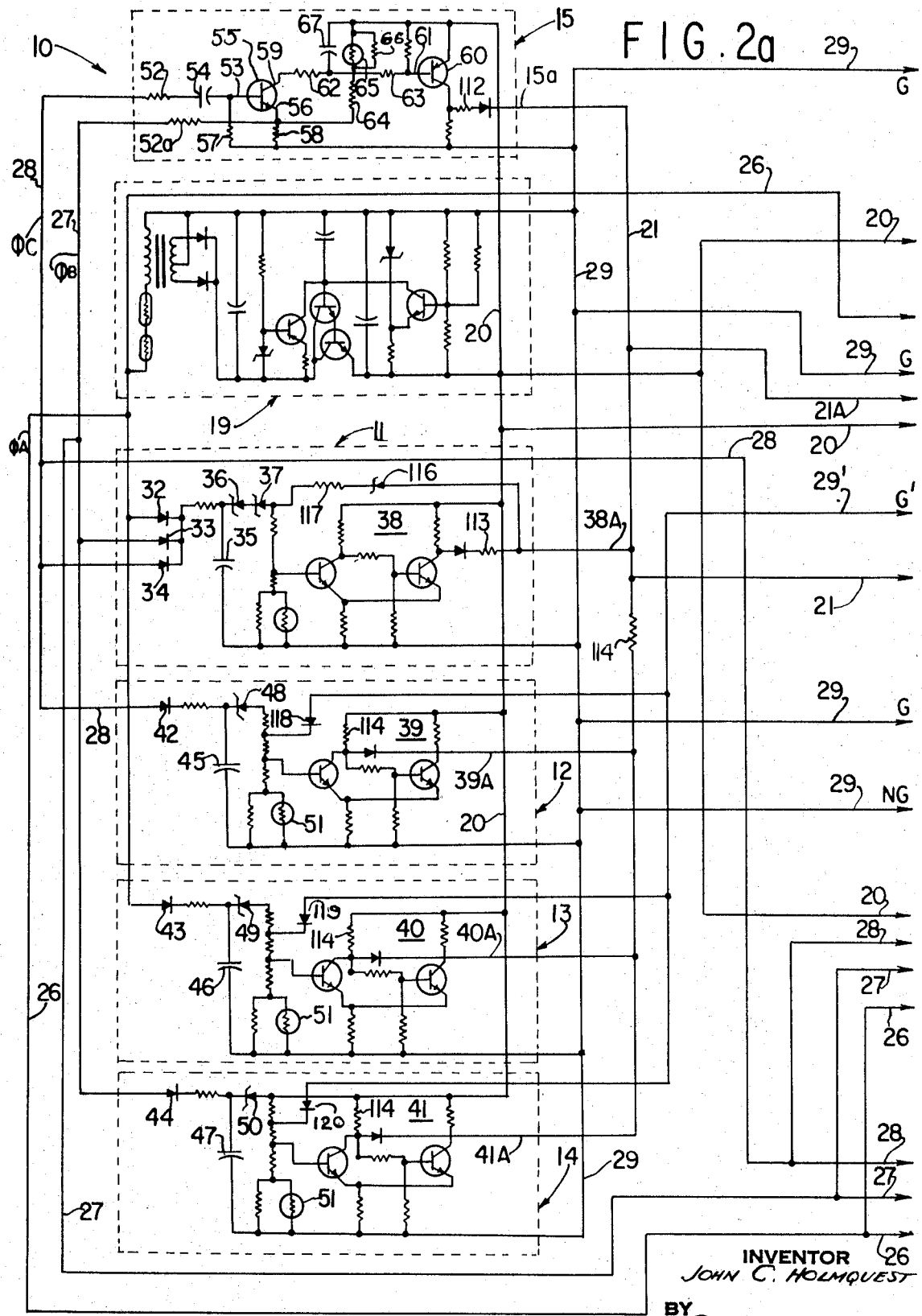

United States Patent Office 3,535,591
Patented Oct. 20, 1970

3,535,591
MONITORING SYSTEM FOR POLYPHASE ELECTRIC SUPPLY SYSTEM
John C. Holmquest, Broadview, Ill., assignor to Sola Basic Industries, Inc., Milwaukee, Wis., a corporation of Wisconsin
Filed Jan. 2, 1968, Ser. No. 695,261
Int. Cl. H02h 3/28, 7/26
U.S. Cl. 317—27    7 Claims

ABSTRACT OF THE DISCLOSURE

A composite monitoring system for a polyphase power supply in which a single time responsive relay system provides an output signal upon errors in over or undervoltage, under or over frequency, or phase sequence. The responsive time of the time responsive relay may depend upon the need for correction.

---

Figure 2B:
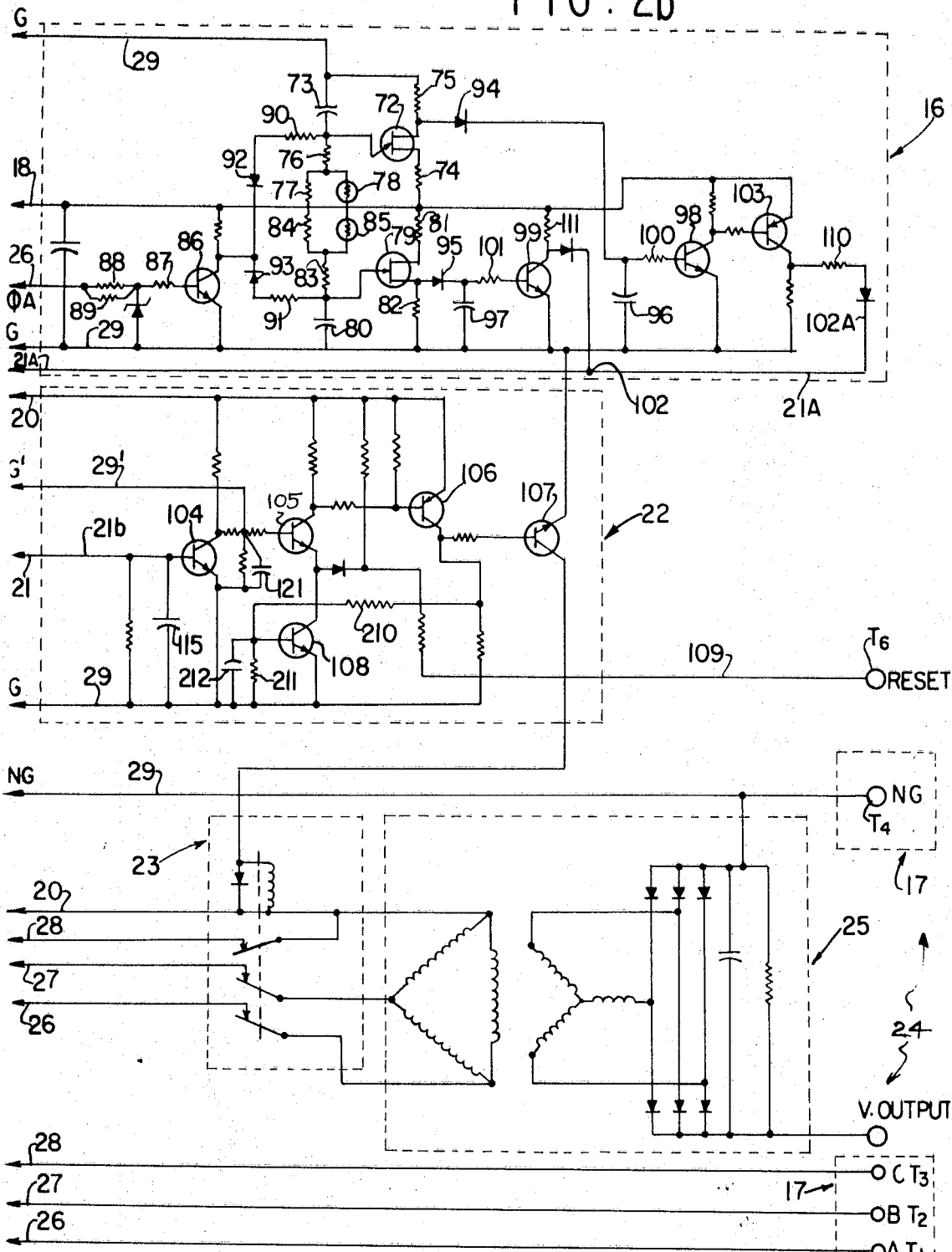

This invention relates to a system for monitoring the supply of polyphase electric power and more particularly to a system for protecting apparatus connected to the supply from over and undervoltage, over and under frequency, and/or improper phase sequence.

While not limited to the same, the invention has particular utility in an electric system for aircraft, such as a three phase, 115/200 volt, 400 Hz. system, wherein it is necessary to protect expensive aircraft equipment from damage due to variations above or below predetermined levels of voltage and frequency and to variations of phase relationship. Various forms of apparatus, some electronic in nature, have been proposed for such purposes, but all have certain disadvantages such as requiring a plurality of electromechanical switches, not being completely integrated into a single system, or not being fully responsive in operation.

An object of the present invention, therefore, is to provide an improved monitoring system for polyphase power systems which is completely integrated to detect over and undervoltage, over and under frequency, and phase variation; which requires only one relay switch; and which is positive and reliable in operation over a wide temperature range.

A further object is the provision of a polyphase monitoring system in which a D.C. power circuit provides a stable D.C. voltage for all of the control circuits of the monitoring system.

In one aspect of the invention, the integrated monitoring system comprises an overvoltage sensing circuit, three undervoltage sensing circuits, one for each phase of a three phase supply system, a phase sequence sensing circuit, and an over and under frequency sensing circuit. Voltage from the three phase power source to be monitored is fed into the system and any error detected by any one or more of the sensing circuits produces an error signal which is fed into a common logic and time-delay circuit. The logic and timing circuit controls the operation of a relay driving circuit which in turn controls the operation of a normally closed relay switch interposed in an output circuit of the monitoring system. The output circuit of the monitor controls the operation of a circuit-breaker, or the like, to open the circuit from the three phase power source to its load whenever an abnormal condition exists in the power system. Circuitry may be included in the logic circuit to prevent reclosing of the relay drive circuit and the relay switch until an external reset switch is operated. The purpose of the time-delay or timing circuit is to provide a predetermined delay in the operation of the logic circuit to take care of momentary variations in voltage, frequency or phase.

A further purpose of the timing circuit is to provide a predetermined response time which may (but not necessarily) vary as a function of the input power parameters. Thereby nuisance drop outs may be held to a minimum while faster response affords protection from major variations.

In a second aspect, the monitoring system includes a D.C. supply circuit which is fed from an A.C. input and provides a stable source of D.C. voltage for operating all of the control circuits of the monitoring system.

The above and other objects, features and advantages of the invention will be apparent from the following description taken in conjunction with the accompanying drawings which illustrate an exemplary embodiment of the invention.

In the drawings:

FIG. 1 is a block diagram illustrating the integrated monitoring system of the present invention; and FIG. 2 is a schematic diagram, divided into FIGS. 2a and 2b, of the circuitry which may be embodied in the system of FIG. 1.

Referring to the block diagram of FIG. 1, the system 10 is shown as comprising an overvoltage sensor 11, three undervoltage sensors 13, 14 and 12, one each for phases A, B and C of a three phase voltage system, a phase sequence sensor 15 and an over and under frequency sensor 16. Three phase input 17 from a power source to be monitored is connected to each of the sensors 11 through 16 by an input bus 18. A D.C. power supply circuit 19, also connected to input bus 18, provides a stable D.C. voltage to a D.C. control bus 20 supplying this voltage to all of the control circuits of the monitoring system.

Any error detected by any one or more of the sensors 11 to 16 inclusive produces an error signal to the error bus 21 which transmits the signal to the logic, timing and relay driving circuitry of box 22 which operates a relay switch 23 or other switching arrangement connected in the output circuit 24 of the monitoring system. If desired, an external power circuit 25 may be interposed between the relay switch 23 and output circuit 24. The output circuit 24 is adapted to be connected to a suitable circuit-breaker (not shown) serving to disconnect the source of A.C. power from its connected load.

Referring now to the circuitry diagram of FIGS. 2a and 2b, three phase voltage from a power system (not shown) is fed from input 17 into lines or busses 26 (phase A), 27 (phase B), 28 (phase C), and 29 (neutral or ground G) through terminals T1, T2, T3 and T4. Ground G or neutral bus 29 provides a return circuit of zero voltage level for all of the circuits hereinafter described.

To provide for overvoltage control, the sensing circuit 11 comprises three half-wave rectifiers or diodes 32, 33 and 34 connected to the input busses 26, 27 and 28 and providing for the peak voltage charging of capacitor 35. Connected across the capacitor 35 through Zener diodes 36 and 37 is a Schmitt triggering circuit 38. The Zener diodes 36 and 37 not only provide an amplification factor between the input and response of circuit 38 but also provide inherent temperature compensation over a large range of temperature. The control circuits of the Schmitt trigger are so adjusted as to provide a plus error signal in its output connection 38A upon the occurrence of an input voltage variation of a predetermined amount.

The under voltage sensors or detectors 12, 13 and 14 comprise similar Schmitt trigger circuits 39, 40 and 41 except that they are individually connected to the phase lines 28, 26 and 27 through rectifiers 42, 43 and 44 to charge capacitors 45, 46 and 47. A circuit including the single Zener diodes 48, 49 and 50 provides the desired reference voltage. Thermistors 51 connected in the circuits of Zener diodes 48, 49 and 50 provide for temperature compensation in the undervoltage sensing circuits. The control circuits of the Schmitt triggers 39, 40 and 41 are such as to provide a plus error signal at their outputs 39A, 40A and 41A whenever a predetermined undervoltage occurs.

Also connected to lines 27 and 28 (phases B and C of input 17), is the phase sequence sensing circuit 15. This circuit comprises a transistor 55 having its base 53 connected to the line 28 through a resistance 52 and capacitor 54 and its emitter 56 connected to line 27 through a resistor 52A. The base 53 and emitter 56 are also connected to ground or neutral (bus 29) through the resistances 57 and 58 respectively. The collector 59 of transistor 55 is connected to the base 61 of a second transistor 60 through resistors 62 and 63. The base emitter junction of transistor 55 is reverse biased under normal operation by connecting the emitter 56 to the internal D.C. bus 20 through resistors 64, 65 and 66. Thus, under abnormal phase sequence transistor 55 is turned on for a portion of each cycle. This allows capacitor 67 to charge thereby turning on transistor 60. A plus error signal occurs at the output 15a when an abnormal phase sequence occurs.

The over frequency and under frequency sensing circuits are located within the box 16 of FIG. 1. The frequency detecting circuit embraces two unijunction transistor (UJT) relaxation oscillators which have been preset to twice the desired under frequency and over frequency limits respectively. The under frequency (UF) oscillator consists of UJT 72, capacitor 73 and resistors 74, 75, 76, 77 and 78. The over frequency (OF) oscillator consists of UJT 79, capacitor 80 and resistors 81, 82, 83, 84 and 85. Without additional circuitry the two UJT relaxation oscillators, which operate from the stable source of D.C. voltage 20, would oscillate at the preset rate, for example, 750 Hz. and 850 Hz. UF and OF, respectively.

However, to provide the sensing function, a line frequency controlled switching transistor 86 is coupled to the charging capacitors 73 and 80 of both UJT oscillators. Transistor 86 switches on and off at a rate controlled by line frequency, the base of transistor 86 being connected to $\phi A$, line 26, through resistors 87, 88 and 89. Under normal operating voltages the "on" and "off" time of transistor 86 is independent of line ($\phi A$) voltage magnitude and waveshape. When transistor 86 is "on" the charging capacitors 73 and 80 are shunted by resistors 90 and 91 through diodes 92 and 93. When the voltage from $\phi A$ to G, line 29, is negative, transistor 86 is "off" and the capacitors are not shunted.

At normal line frequency (375 to 425 Hz.) the "off" time of transistor 86 is long enough to allow capacitor 80 to charge up to the peak emitter voltage of UJT 79, thereby resulting in a pulse output across resistor 82; but is not long enough to allow capacitor 73 to charge up to the peak emitter voltage of UJT 72. Therefore, at normal line frequency (375 to 425 Hz.) a pulse output occurs across resistor 82 and no pulse output occurs across resistor 75. At a line frequency greater than 425 Hz., the "off" time of transistor 86 is too short to allow either capacitor 73 or 80 to discharge through the respective UJT's and no pulse output occurs across resistor 82 or 75. At a line frequency less than 375, the "off" time of transistor 86 is long enough to allow both capacitors 73 and 80 to discharge through the respective UJT's and pulse outputs occur across both resistors 82 and 75.

Connected to resistors 82 and 75 through diodes 94 and 95 are capacitors 96 and 97 which integrate the pulse outputs of the UJT relaxation oscillators and provide turn on base drive to transistors 98 and 99 through resistors 100 and 101. Transistors 98 and 99 control the error signal at the outputs 102 and 102A. If the line frequency is greater than 425 Hz., no pulse output occurs across resistor 82 and transistor 99 is "off" allowing a plus error signal to occur at the output 102.

If the line frequency is less than 375, a pulse output occurs across resistor 75 turning on transistor 98, thereby turning on transistor 103 and allowing a plus error signal to occur at the output 102A. Outputs 102 and 102A are fed by line 21A to error bus 21.

Thermistors 78 and 85 are used for temperature compensation at low temperatures without effecting the preset values of resistors 76 and 83 at normal temperatures.

The outputs of the individual sensing circuits are connected to the common error bus 21. The error bus 21 is fed into the logic, time delay and relay driving circuits of box 22 by the line 21b. When a plus error signal occurs on the error bus 21 from any one or more of the sensing circuits, transistor 104 turns on after a preset delay causing transistor 105 to turn off. When transistor 105 turns off, it causes transistors 106, 107 and 108 to turn off. Transistor 107 is the driving transistor for the relay switch 23. When no error voltage exists, transistor 104 will turn off and transistors 105, 106, 107 and 108 will automatically turn on if a connection is made between point 109 ("T$_6$") and neutral or ground 29, either internally, or externally through a "reset" switch (not shown). Therefore, reset can be either automatic or manual through an external switch as desired.

The relay 23 will not be re-energized unless no error voltage exists on the error bus 21 (i.e., input voltages, frequency and phase sequence are within predetermined limits) and a momentary connection is made between point 109 and neutral 29. This allows transistor 105 to turn on, thereby biasing transistor 108 on through resistors 210 and 211 after transistor 106 has turned on. Capacitor 212 prevents noise triggering of the reset transistor 108.

The time delay in operation of relay 23 is preset but variable as a function of input parameters. These response times for relay pick-up and drop out must meet predetermined limits over a wide temperature range. As input voltage of any phase departs further from a predetermined value, drop out response time diminishes at a predetermined rate. Various circuits determine the response times. Basic response times are determined by resistors 110, 111, 112, 113 and 114 in the output of sensing circuits 11, 12, 13, 14, 15 and 16 and the charging capacitor 115. Speed up in over-voltage response time is accomplished by the bypass circuit including avalanche diode 116 and resistor 117. Speed up in undervoltage response time is accomplished by diodes 118, 119 and 120 discharging capacitor 121 through line 29' at a rate accelerated by lower input phase voltage.

The D.C. supply circuit 19 is a typical temperature compensated, solid state, full wave rectifying circuit for providing a stabilized D.C. control voltage to the bus 20. The external power supply 25 is merely, in effect, a transformer amplifier for providing an output voltage for operating the main system and breaker as above described.

While an exemplary embodiment of the invention has been shown and described, it will be evident that alterations, changes and modifications thereof may be made without departing from the spirit of the invention.

What is claimed is:

1. In an integrated monitoring system responsive to changes in parameters of a polyphase A.C. supply system, a first sensing circuit means connected to said supply system for producing an error signal in response to a predetermined overvoltage in any phase of the system, a second plurality of sensing circuit means connected to separate phases of said supply system for producing error signals in response to a predetermined undervoltage in any of said phases, a third sensing circuit means connected to said supply system for producing error signals in response to predetermined over and under variations in the supply frequency, a common error circuit means for receiving an error signal from any one or more of said sensing circuit means, output terminals, circuit means including a switch means for providing power to said output terminals, logic circuit means connected to said common error circuit means for operating said output circuit switch means upon occurrence of any error, means for effecting individual predetermined time delays in the response of said logic circuit means to error signals from each of said sensing circuit means, and means for varying the response time of said logic circuit means thereby to speed-up operation of said switch means in response to the amount of variation in the supply voltage.

2. A monitoring system defined in claim 1 wherein said overvoltage sensing circuit means of each of said undervoltage sensing circuit means includes a Schmitt type triggering circuit.

3. A monitoring system as defined in claim 1 in which said means for varying the response time of said logic circuit means includes an avalanche diode connected in a circuit bypassing a triggering circuit of said overvoltage sensing circuit means.

4. A monitoring system as defined in claim 1 in which said means for varying the response time of said logic circuit means includes a capacitance in the logic circuit means connected for discharge through a diode bypassing the triggering circuits of said undervoltage sensing circuit means.

5. A monitoring system as defined in claim 1 in which said logic circuit means includes a circuit means adapted for either internal or external connection to said supply system thereby to provide for either automatic or manual reset of said switch means upon cessation of an error signal.

6. A monitoring system as defined in claim 1 wherein said third frequency sensing circuit means includes two timing circuit means each including a time charged capacitor, switching means responsive to supply frequency for determing the charge accumulated by said capacitors during each A.C. cycle, and means operable by the charge on said capacitors for producing error signals in response to supply frequencies over and below predetermined limits.

7. A monitoring system as defined in claim 6 in which each of said timing circuit means comprises a unijunction transistor controlled relaxation oscillator circuit means.

References Cited

UNITED STATES PATENTS

| | | | |
|---|---|---|---|
| 3,302,063 | 1/1967 | Leenhouts | 317—27 |
| 3,422,314 | 1/1969 | Legatti | 317—31 |
| 3,302,064 | 1/1967 | Redmon | 317—31 |

J D MILLER, Primary Examiner

H. FENDELMAN, Assistant Examiner

UNITED STATES PATENT OFFICE
CERTIFICATE OF CORRECTION

Patent No. 3,535,591      Dated October 20, 1970

Inventor(s) John C. Holmquest

It is certified that error appears in the above-identified patent and that said Letters Patent are hereby corrected as shown below:

Column 5, line 9, "of" (first occurrence) should be --and--.

SIGNED AND SEALED
FEB 2 1971

(SEAL)
Attest:

Edward M. Fletcher, Jr.
Attesting Officer

WILLIAM E. SCHUYLER, JR.
Commissioner of Patents